United States Patent [19]

Pleva

[11] 3,890,828

[45] June 24, 1975

[54] DEVICE FOR MEASURING THE HUMIDITY OF GASEOUS SUBSTANCES

[75] Inventor: Harry Pleva, Rutesheim, Germany

[73] Assignee: Werner & Pfleiderer, Stuttgart, Germany

[22] Filed: May 29, 1973

[21] Appl. No.: 364,612

[30] Foreign Application Priority Data
May 30, 1972 Germany............................ 7225853

[52] U.S. Cl. .................... 73/29; 73/336.5; 73/338.6
[51] Int. Cl. ............................................. G01n 25/62
[58] Field of Search ......... 73/338.6, 336.5, 29, 64.2

[56] References Cited
UNITED STATES PATENTS

| | | | |
|---|---|---|---|
| 1,601,243 | 9/1926 | Irwin.................................. | 73/338.6 |
| 1,620,864 | 3/1927 | Benesh............................... | 73/338.6 |
| 1,894,172 | 1/1933 | Guthrie.............................. | 73/338.6 |
| 1,942,934 | 1/1934 | Reeve................................. | 73/338.6 |
| 2,485,894 | 10/1949 | Kuhn ................................. | 73/338.6 |

Primary Examiner—S. Clement Swisher
Assistant Examiner—Denis E. Corr
Attorney, Agent, or Firm—Walter Becker

[57] ABSTRACT

A device for measuring the humidity of gaseous substances according to which the measuring is effected in conformity with the psychrometric method in a measuring chamber in which a dry thermometer and a wet thermometer are exposed to the gaseous substance to be measured and the wet thermometer is held in wet condition by means of an evaporation or aspiration element by a cooling liquid. In the feeding line for supplying gaseous substance to be measured to the measuring chamber there is provided a heat exchanger having associated therewith a cooling blower and an electric heating means, while a thermostatic control device is provided by which the temperature of the gaseous substance flowing into the measuring chamber is controlled so as to have a substantially constant value, this control being effected by turning on, if necessary, the cooling blower or the heating means.

7 Claims, 1 Drawing Figure

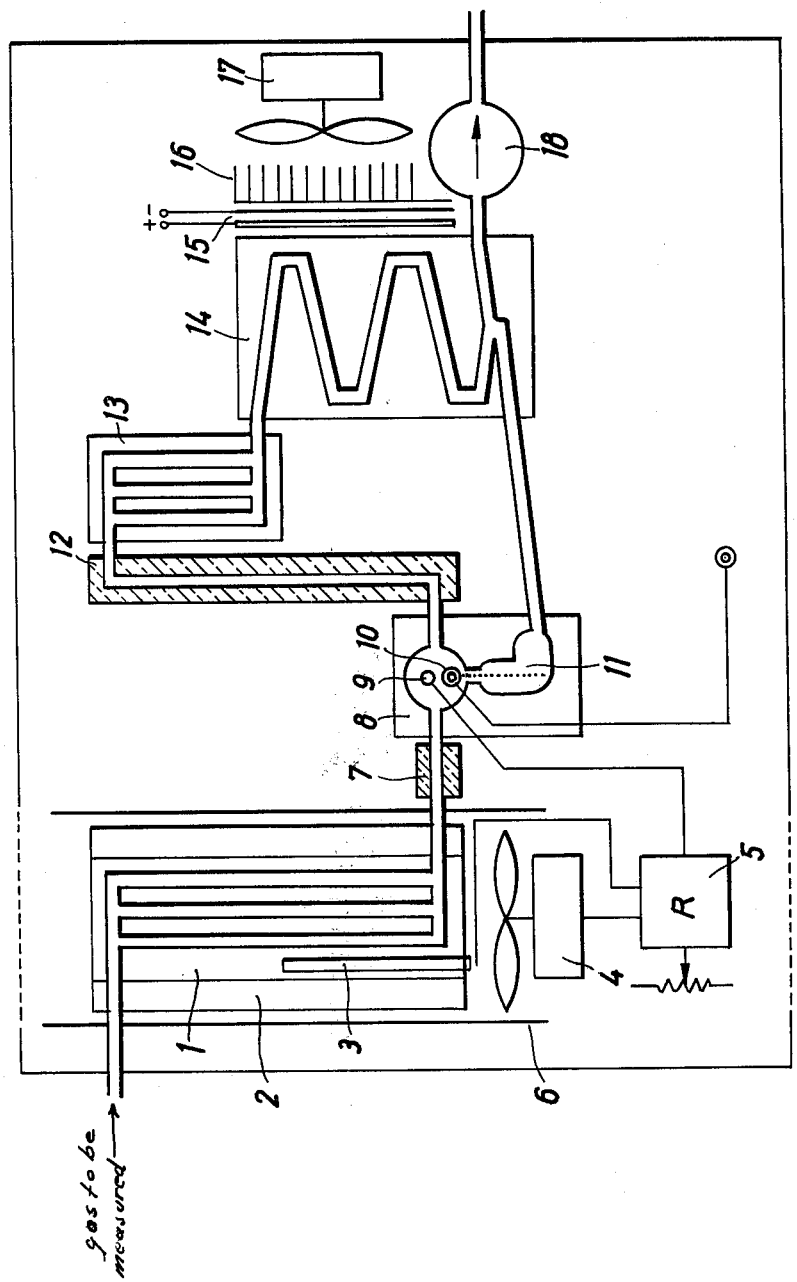

DEVICE FOR MEASURING THE HUMIDITY OF GASEOUS SUBSTANCES

The present invention relates to a device for measuring the humidity of gaseous substances according to which the measuring is effected in conformity with the psychrometric method in a measuring chamber, in which a dry thermometer and a wet thermometer are exposed to the gaseous substance to be measured, and the wet thermometer is held in wetted condition by means of an evaporation or aspiration element by a cooling liquid.

With heretofore known measuring devices operating in conformity with the psychrometric method, it is necessary to determine the temperature at the dry thermometer as well as the temperature at the wet thermometer, and from the ascertained values to determine the absolute humidity of the gaseous substance to be measured. A further difficulty encountered with heretofore known measuring devices of the above mentioned type consists in that undesired reactions may occur between the wet thermometer and the cooling liquid employed in connection therewith.

It is, therefore, an object of the present invention to provide a measuring device for measuring the humidity of gaseous substances, which will make it possible by means of the temperature ascertained at the wet thermometer directly to determine the humidity of the gaseous substance to be measured.

This object and other objects and advantages of the invention will appear more clearly from the following specification in connection with the accompanying drawing diagrammatically illustrating a measuring device according to the present invention.

The measuring device according to the invention for measuring the humidity of gaseous substances, according to which the measuring is effected in conformity with the psychrometric method in a measuring chamber in which a dry thermometer and a wet thermometer are exposed to the gaseous substance to be measured and in which the wet thermometer is kept in wet condition by means of an evaporation or aspiration element by a cooling fluid, is characterized primarily in that in the feeding line for supplying gaseous substance to the measuring chamber, there is provided a heat exchanger which is equipped with cooling fins and a cooling blower as well as with an electric heating cartridge, and is furthermore characterized in that a thermostatic control device is provided in which the temperature of the gaseous substance flowing into the measuring chamber is controlled so as to have a substantially constant value, this control being effected by turning on if necessary the cooling blower or the heating cartridge.

Due to the fact that the gaseous substance to be measured is controlled so as to have a constant, if desired, adjustable temperature value, the measuring method is greatly simplified. A further improvement and simplification is obtainable in conformity with the present invention by employing the dry thermometer in the measuring chamber as an actual value feeler for the temperature of the gaseous substance to be measured which feeler acts upon the thermostatic control device.

With heretofore known measuring devices of the general type referred to above, a cooling fluid supplied from the outside is employed for cooling the wet thermometer. In these circumstances, due to the influence of the differently high temperatures and the respective different chemical composition of the gaseous substances to be measured, a reaction may occur which falsifies the measuring result.

In connection with the control operation according to the present invention by means of which the temperature of the gaseous substance to be measured is to be kept at a constant value, a further increase in the measuring precision is obtained due to the fact that in conformity with a further feature of the invention, the cooling fluid is not supplied from the outside but a condensate of the gaseous substance to be measured is conveyed to the evaporation element of the wet thermometer.

To this end, according to a further development of the invention, it is provided that in the flow direction of the gaseous substance to be measured there is arranged a condenser which has an exit or outlet connected to the measuring chamber through a pipe line and which is located at a higher level than the end of the evaporation element pertaining to the wet resistant thermometer. This condenser may expediently so be constructed that from the gaseous substance to be measured always such a quantity of a condensate is precipitated that the continuous supply to the wet thermometer of the condensate serving as cooling fluid will be assured. Advantageously, at the exit of the condenser a pump may be arranged at such a level that excessive condensate can automatically be pumped off through the connection of the pump.

Referring now to the drawing in detail, it may be mentioned that the humidity measuring device according to the invention is shown only in its general construction and permits the measuring of the humidity of a gas which is contained in a non-illustrated working chamber and may have any desired temperature. Such humidity measuring operation is necessary above all where in an oven or furnace a processing operation is effected as for instance the steaming, baking, annealing in a protective gas, ceramic sintering or other drying processes in connection with the manufacture of textile products, plywood plates, felt and wool products, and food products as well as in connection with other manufacturing and processing processes. With processes of the above mentioned type, the humidity in the work shop has a considerable influence upon the quality of the respective product.

For measuring the humidty of a gaseous substance in conformity with the present invention, a small quantity of the gas to be measured is through a non-illustrated filter, which may be arranged within or outside of the work shop, drawn in through a non-illustrated pipe or hose and conveyed to a heat exchanger 1. This heat exchanger 1 has a plurality of laterally protruding cooling fins 2. The incoming gas is passed through a plurality of vertically downwardly leading conduits. This vertical arrangement of the conduits prevents the condensate from precipitating from the gas to be measured already in the heat exchanger. In the heat exchanger 1, the measuring gas may by means of an electric heating cartridge 3, be either heated up or by means of a blower 4 be cooled in such a way that after entering a measuring chamber 8, the gas to be measured will have a constant selectively adjustable temperature. The respectively required heating up or cooling operation is controlled by a controlling device 5 which cooperates with a dry thermometer 9 registering the respective actual value of the temperature in the measuring chamber 8, said thermometer 9 extending into the measuring chamber 8. Furthermore, a wet thermometer acting as lithium chloride feeler 10 is, in the measuring chamber 8, so suspended that a mantle (Strumpf) 11 connected to said feeler and acting as evaporation element extends into the condensate which collects at the bottom of the measuring chamber and is precipitated from the gas to be measured.

The lithium chloride feeler 10 is built up in any standard manner. In view of the fact that the temperature in the measuring chamber 8 is kept constant by means of the temperature feeler 9 and the controlling device 5 which turns on in conformity with the requirement of either the heating cartridge 3, or the blower 4, it is possible without a comparative measurement that the lithium chloride feeler furnishes directly a precise indication of the humidity within the desired measuring range.

In order to obtain the condensate necessary as cooling fluid for the feeler 10, the gas to be measured is conveyed behind the measuring chamber 8 through an insulated conduit 12 into a protective cooler 13 and is subsequently conveyed to a condensate former (condenser) 14. This condensate former may be cooled by peltier elements 15. These elements 15 are connected to a cooling body 16 which can be vented by a blower 17.

In order to maintain the flow of gas to be measured, the exemplary embodiment of the invention shown in the drawing is provided with a measuring gas delivery pump 18 which is designed as a rotary vane pump, and has a delivery output of approximately 500 liters per hour. The pump 18 is by means of a suction pipe connected to the condensate former 14 at such a height that it will be able in addition to withdrawing the measuring gas also to withdraw the condensate when the latter has risen in the measuring chamber to too great a height. In this way, it will be assured that for the wet thermometer 10 there will always be available a sufficient quantity of condensate.

It has been found advantageous to provide a thermal insulation 7 for the connecting conduit from the heat exchanger 1 to the measuring chamber 8, said heat exchanger 1, for increasing the effect of the blower 4, being provided with a guiding housing 6.

In order to be able immediately to recognize any soiling, the measuring chamber 8 is expediently provided with a transparent cover.

It is, of course, to be understood that the present invention is, by no means, limited to the specific showing in the drawing but also comprises any modifications within the scope of the appended claims.

What I claim is:

1. A device for measuring the humidity of gaseous substances in conformity with the psychrometric method, which includes: heat exchanger means for heat exchange with a gaseous substance the humidity of which is to be measured, a measuring chamber arranged in series with said heat exchanger means for receiving from the latter the gaseous substance the temperature of which is to be measured, first conduit means for conveying gaseous substance the humidity of which is to be measured to said heat exchanger means, second conduit means leading from said heat exchanger means to said measuring chamber for conveying gaseous substance after its heat exchange with said heat exchanger means to said measuring chamber, a cooling blower and electric heating means associated with said heat exchanger means for respectively cooling and heating up the gaseous substance passing through said heat exchanger means, and thermostatic control means operatively connected to said measuring chamber and operable automatically to control the operation of said blower and said electric heating means so as to maintain substantially constant the temperature of the gaseous substance the humidity of which is to be measured in said measuring chamber, a dry resistance thermometer arranged in said measuring chamber, a dry resistance thermometer arranged in said measuring chamber and operable to serve as actual value feeler and operatively connected to said thermostatic control means, a wet resistance thermometer arranged in said measuring chamber, and also condenser means arranged in series and in communication with but behind said measuring chamber when looking in the direction of flow of the gaseous substance passing from said measuring chamber to said condenser means, said condenser means having an outlet, said wet resistance thermometer arranged in said measuring chamber having an aspiration element, and third conduit means having one end connected to said outlet and having its other end connected to said aspiration element, said other end of said third conduit means being located at a lower level than said outlet.

2. A device according to claim 1, in which said heat exchanger means is provided with cooling fins.

3. A device according to claim 1, in which said electric heating means is formed by an electric heating cartridge.

4. A device according to claim 1, in which said second conduit means has its outer periphery provided with a heat insulating cover.

5. A device according to claim 1, in which said measuring chamber has a transparent cover to permit checking the interior thereof during its operation.

6. A device according to claim 1, which includes suction pump means connected to the lower portion of said condenser means.

7. A device according to claim 6, in which said suction pump means has a suction side connected to said condenser means at such a level that the measuring chamber is continuously supplied with condensate from said condenser means and that excessive condensate is withdrawn and discharged by said suction pump means.

* * * * *